United States Patent
Lee

[11] Patent Number: 5,887,943
[45] Date of Patent: Mar. 30, 1999

[54] BICYCLE SEAT THRUST SUPPORT

[76] Inventor: Christopher J. Lee, 713 Burning Mountain Ave., New Castle, Colo. 81647

[21] Appl. No.: 859,134

[22] Filed: May 20, 1997

Related U.S. Application Data

[60] Provisional application No. 60/017,964 May 20, 1996.

[51] Int. Cl.[6] ........................................... B62J 1/28
[52] U.S. Cl. ................................... 297/215.12; 297/215.1
[58] Field of Search ........................... 297/195.1, 215.12, 297/215.13, 353, 215.1, 215.11

[56] References Cited

U.S. PATENT DOCUMENTS

| | | | |
|---|---|---|---|
| 1,113,833 | 10/1914 | Ruff | 297/215.12 X |
| 1,139,184 | 5/1915 | Johnson | 297/215.12 |
| 1,190,828 | 7/1916 | Weed . | |
| 3,901,534 | 8/1975 | Popken | 280/289 |
| 4,313,639 | 2/1982 | Ware | 297/215.12 X |
| 4,363,516 | 12/1982 | Braly et al. | 297/195 |
| 4,475,770 | 10/1984 | Persons, II | 297/353 |
| 4,909,522 | 3/1990 | Flanigan | 297/195 |

FOREIGN PATENT DOCUMENTS 791658  12/1935  France ........................... 297/215.12

*Primary Examiner*—Peter R. Brown
*Attorney, Agent, or Firm*—John R. Wahl; Holland & Hart LLP

[57] ABSTRACT

A thrust aid device to permit a bicycle rider to apply increased thrust to the pedals of the bicycle. The thrust aid device comprises an elongated mounting member having one end adapted to be fastened to the seat post of a bicycle and a movable thrust arm connected to the opposite end of the mounting member. The thrust arm is selectively movable between a first storage position and a second raised and operable position wherein the rider can push his or her hips against the thrust arm in the second position while pedaling in order to apply increased thrust to the pedals. One preferred embodiment has a vertically oriented sleeve in which the thrust arm slides between a retracted position and a raised operating position. The rider pushes the thrust arm down to move it to the retracted or storage position. A spring raises the thrust arm to the operating position when a latch is actuated. Another preferred embodiment has a rotary joint where the rider pushes the arm down to disengage a slot and then rotate the arm rearward to a storage position.

8 Claims, 9 Drawing Sheets

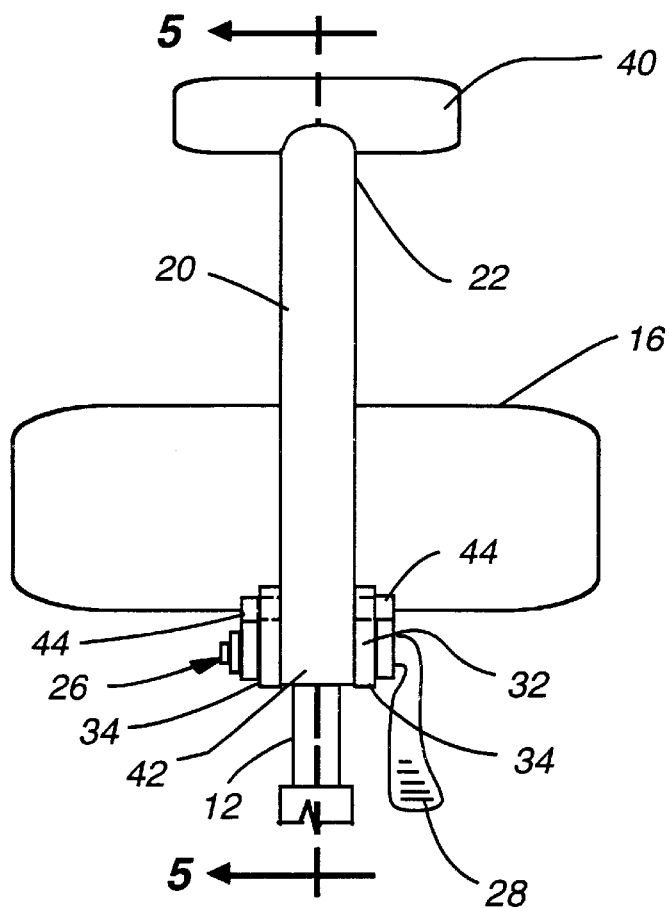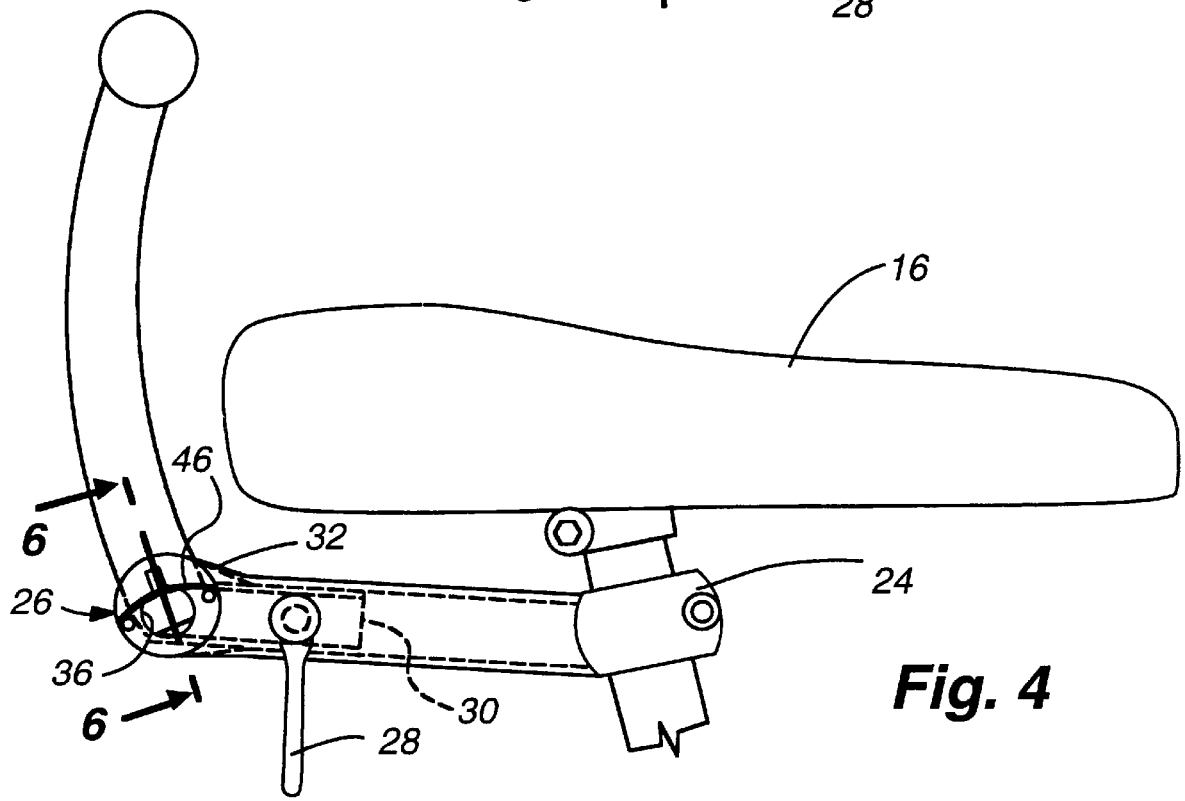

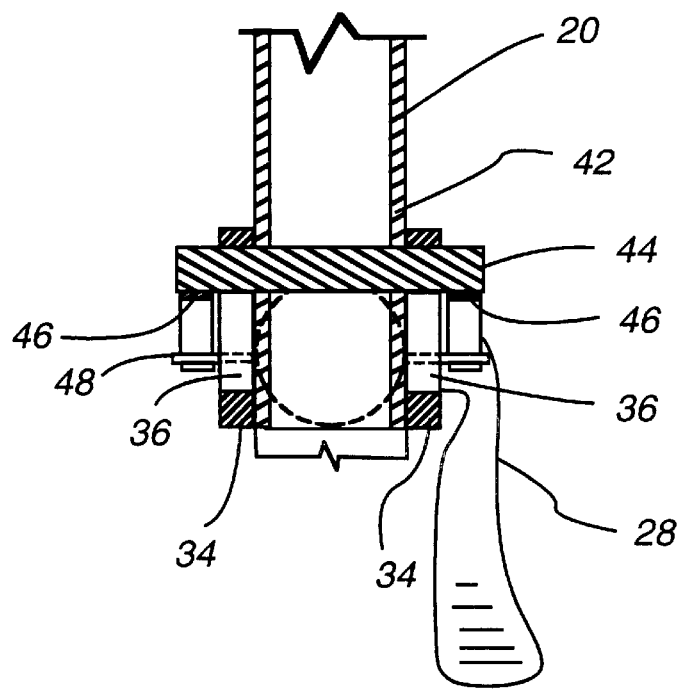
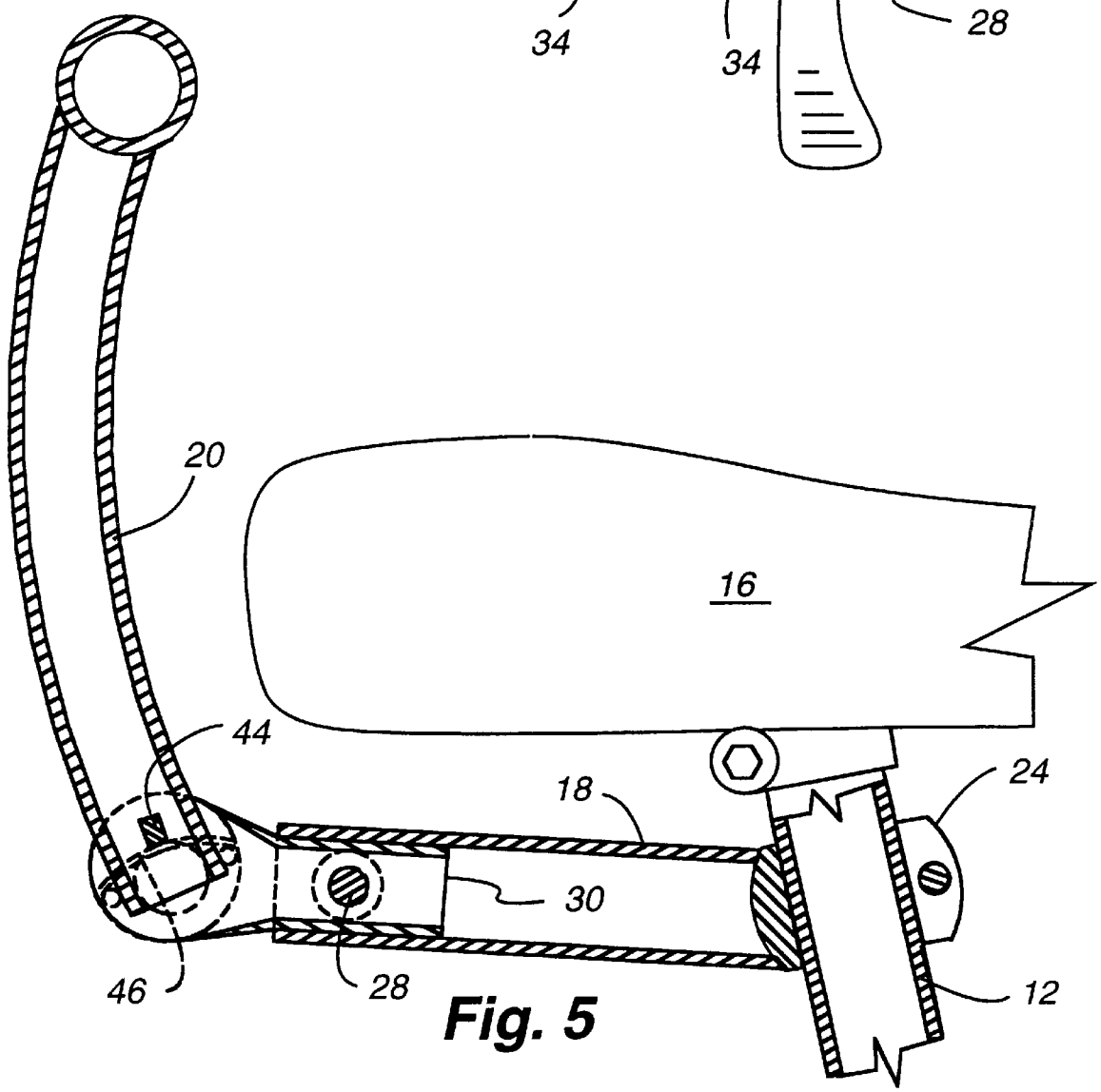

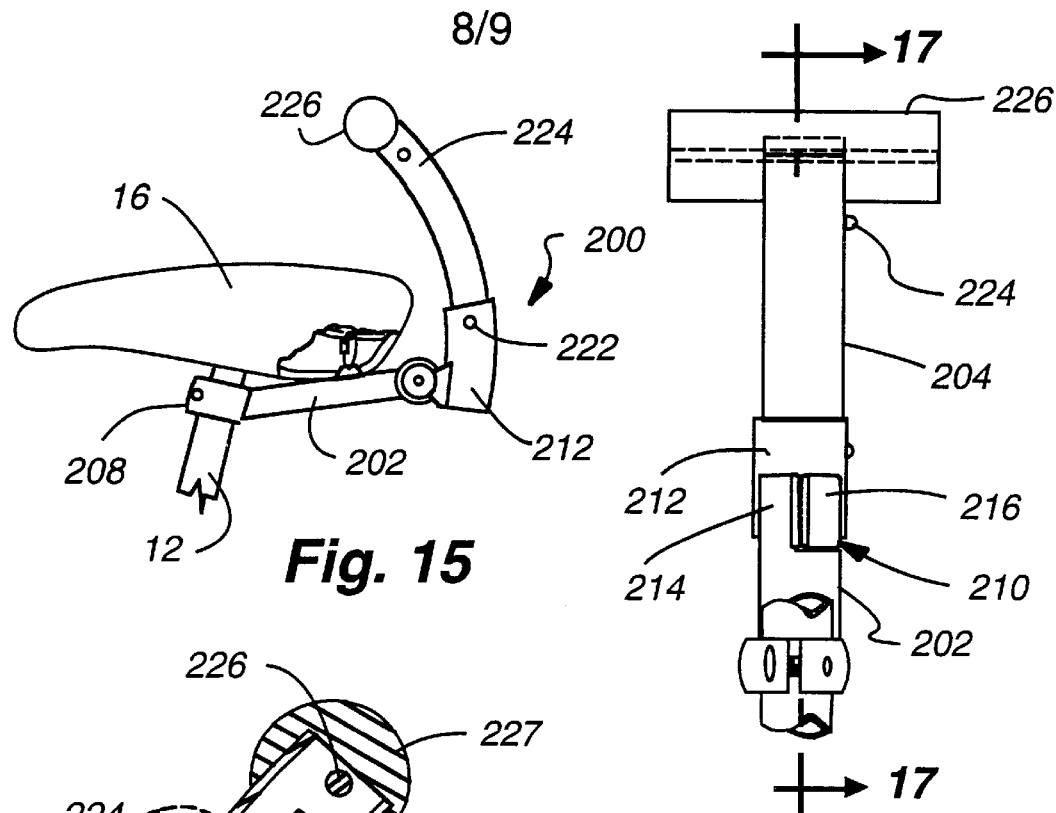
Fig. 15
Fig. 16
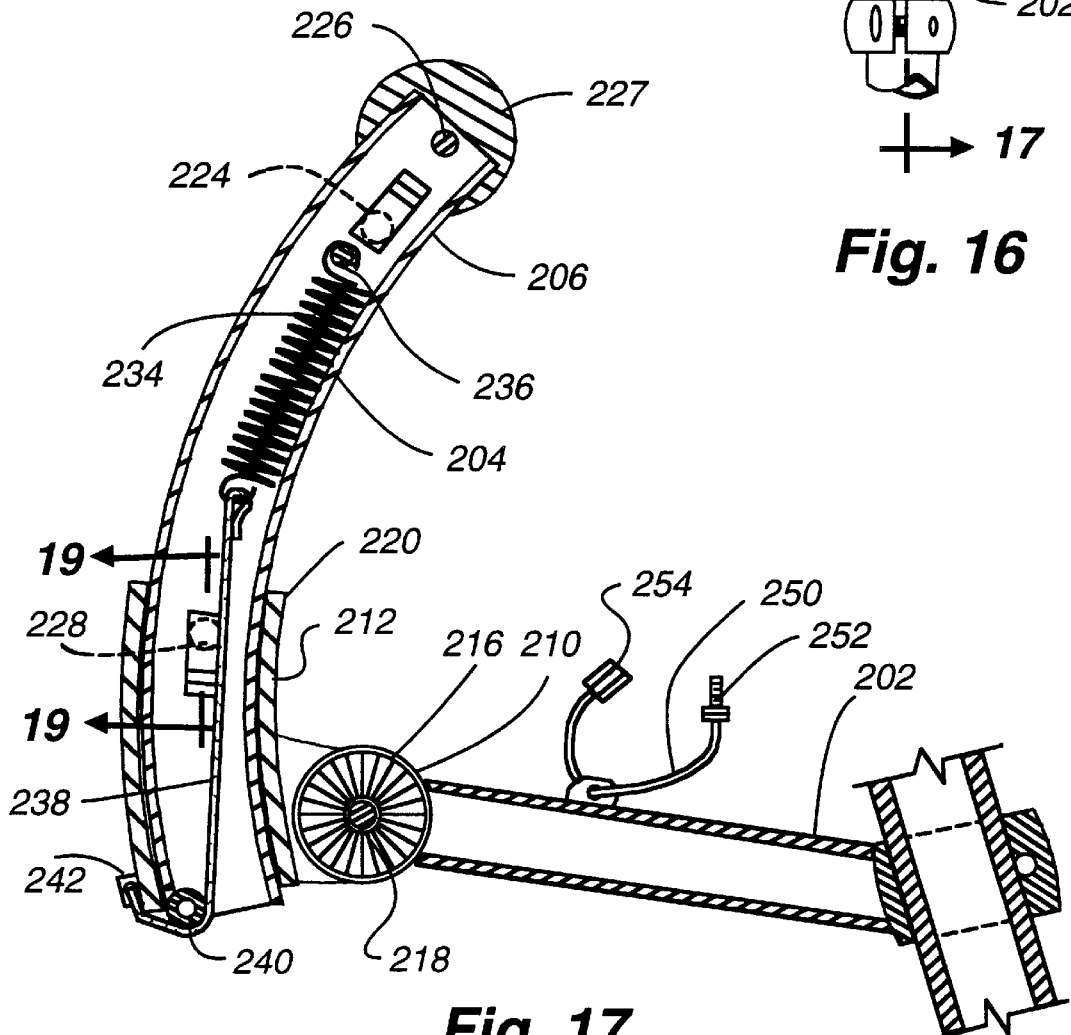
Fig. 17

BICYCLE SEAT THRUST SUPPORT

CROSS REFERENCE TO RELATED APPLICATIONS

This application claims the benefit of U.S. Provisional Patent Application Ser. No. 60/017,964 filed on May 20, 1996.

BACKGROUND OF THE INVENTION

1. Field of the Invention

This invention generally relates to bicycles and more particularly to an aid for increasing leg thrust that can be applied to the pedals by the bicycle rider while seated on the bicycle seat.

2. Description of the Related Art

Mountain bikes have been developed over the past ten years particularly for use off and on normal bike paths and roadways. These bicycles are particularly sturdy. They must be capable of being ridden over all types of terrain. In navigating such terrain, the rider often must stand on the pedals and position his or her weight ahead of or behind the saddle or seat. In this latter instance, the rider must be able to clear the seat easily. Thus narrow seats are preferred as opposed to the wide, cushioned seats often found on older model touring or recreational bicycles. The mountain bike rider also must go up much steeper slopes than most road bikes are designed for. Such slopes require very low gearing and substantial thrust applied to the pedals.

Thrust aids for use by a bicycle rider to enhance his or her leg thrust applied to the pedals have been proposed in several patents. U.S. Pat. No. 4,909,5306 discloses a short, contoured back support which is adapted to be attached to the contoured sides of the bicycle seat. This support projects above the rear of the seat several inches. U.S. Pat. No. 4,363,516 discloses an inverted U shaped thrust support which has its free legs fastened to the rails which support the bicycle seat on the seat post. This thrust support also projects upward behind the seat several inches.

Both of these supports are relatively permanently attached to the bicycle seat and because they project up above the seat, they preclude the rider positioning his or her weight well to the rear of the seat as may often be necessary on downhill runs on a mountain bike. Thus these supports, while effective to assist in applying maximum thrust to the pedals while sitting on the seat, are effectively unusable on mountain bikes. Other back rests and supports are disclosed in U.S. Pat. Nos. 4,475,770; 3,901,534; and 1,190,8312. None of these back rests are designed as an aid to the rider in applying force to the pedals. Accordingly, there is a need for a thrust support for a bicycle which can be readily utilized on mountain bikes. There is also a need for a thrust support which does not hinder the rider in negotiating downhill portions of a trail and still provide substantial support for leg thrusts while the rider is seated.

SUMMARY OF THE INVENTION

It is therefore an object of the present invention to provide a bicycle thrust support which can be used on demand and which can be positioned to clear the bicycle seat for downhill navigation.

It is another object of the present invention to provide a retractable bicycle thrust support that can be easily positioned with one hand.

It is another object of the present invention to provide a retractable bicycle thrust support that has an operational position and a storage position behind the bicycle seat.

The thrust aid device in accordance with the present invention basically comprises a mounting member having one end fastened to either the bicycle seat or the bicycle seat post and a movable thrust arm member attached to the other end of the mounting member. The thrust arm member is movable between a first storage position and a second operating position behind the bicycle seat. In the first position, the movable thrust member is positioned at or below the level of the seat's upper surface so that the rider can move forward and back over the seat without any impediment. In the second position, the movable thrust aid member projects above the rear of the seat from behind and is held stationary so that the rider can push his or her buttocks against the movable member to aid in applying thrust to the pedals while seated.

In one preferred embodiment, the thrust aid device comprises a mounting member fastened to the seat post and a thrust aid member pivotally attached to the other end of the mounting member so that it is free to rotate in a vertical arc between a lowered storage position and an upright operating position. The thrust arm is retained in the upright position by a locking bar which slips into and engages a slot in a U shaped joint at the distal end of the mounting member. The rider merely pushes down on the thrust arm against spring pressure to disengage the locking bar and rotate the thrust arm downward to the storage position in which the locking bar again engages the slot to hold the thrust arm in place.

A second preferred embodiment is similar to the first, except that the orientation of the locking bar with relation to the central axis of the thrust arm may be adjusted so that the angle between the thrust arm and the mounting member may be changed via a quick release skewer arrangement.

In a third preferred embodiment, the apparatus comprises an elongated mounting member having one end adapted to be fastened to a bicycle seat stem or post, a thrust arm member support sleeve adjustably fastened to an opposite end of the mounting member, and a retractable thrust member slidably disposed in the thrust member support sleeve. The thrust member is spring biased toward the second or operating position in the support sleeve in which an upper portion of the arm extends above the seat. The rider can lower the thrust member to the retracted first or storage position in the support sleeve when the thrust member is not needed for support so that the upper portion of the thrust arm member is retained below the seat by disengaging a latch pin and pushing down on the thrust arm member. In other embodiments, the latch may be omitted in the operating position. In order to retract the support, the rider may simply sit on the thrust support to push it down to the retracted position. This retracted position allows the rider to move his or her center of gravity back behind the seat for more balance and control during descents.

These and other objects, features and advantages of the present invention will become more apparent from the following detailed description when taken in conjunction with the accompanying drawing figures.

BRIEF DESCRIPTION OF THE DRAWING

FIG. 3 is a rear view of the thrust aid device shown in FIG. 2.

FIG. 4 is an enlarged side view of the first embodiment of the thrust aid device in accordance with the first embodiment of the invention shown in FIGS. 1 through 3.

FIG. 5 is a sectional view of the thrust aid device shown in FIGS. 1–3 taken along the line 5—5 in FIG. 3.

FIG. 6 is a sectional view of the first embodiment of the thrust aid device taken along the line 6—6 in FIG. 4.

FIG. 15 is a side view of a third embodiment of the thrust aid device in accordance with the present invention mounted on a bicycle seat post.

FIG. 16 is a front view of the third embodiment of the thrust aid device in accordance with the present invention.

FIG. 17 is a sectional view of the third embodiment shown in FIGS. 15 and 16 taken along the line 17—17 in FIG. 16.

DETAILED DESCRIPTION OF THE INVENTION

Figure 1:
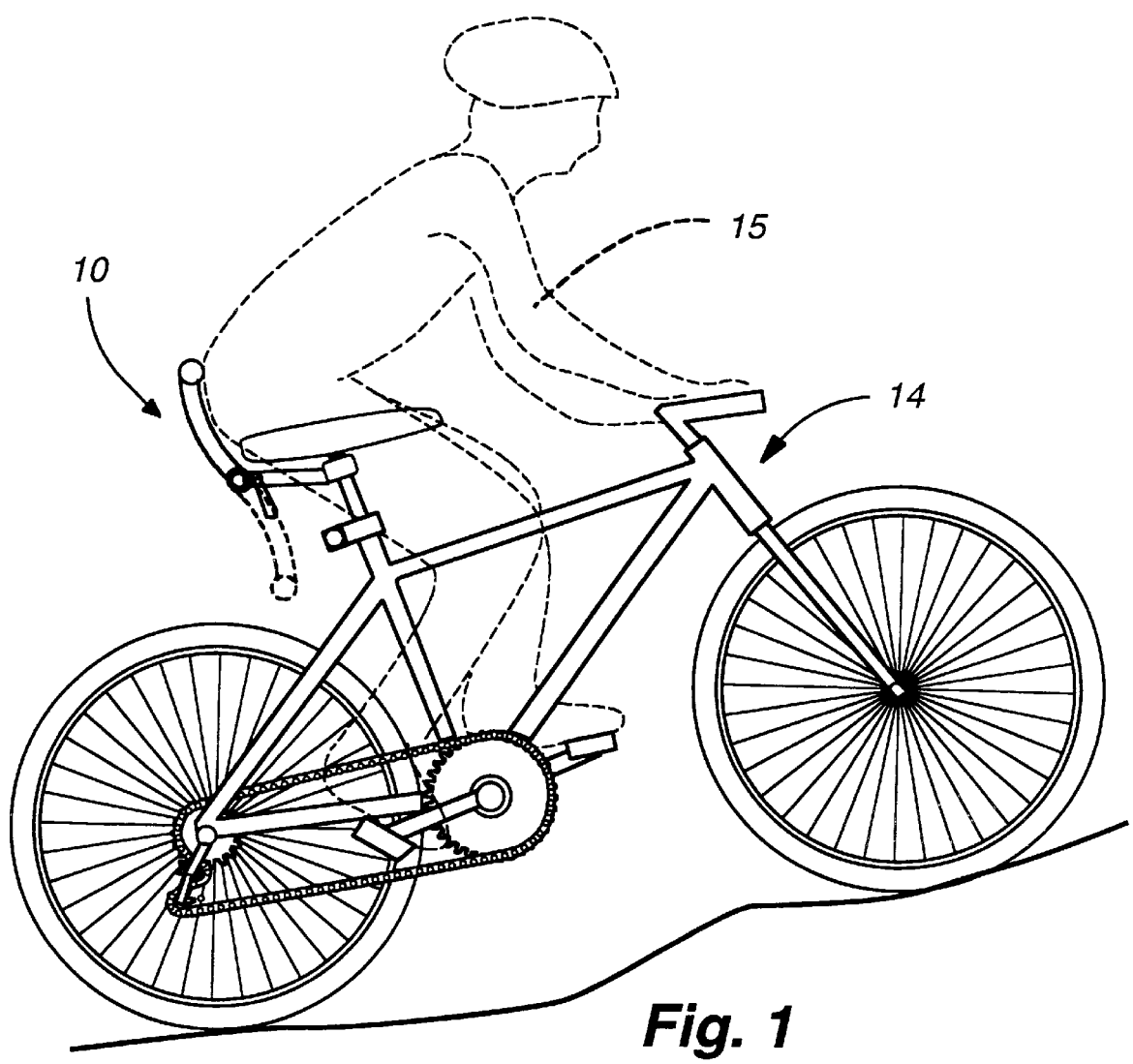
FIG. 1 is a side view of a bicycle showing a thrust support in accordance with a first embodiment of the invention attached to the bicycle seat post.
Figure 2:
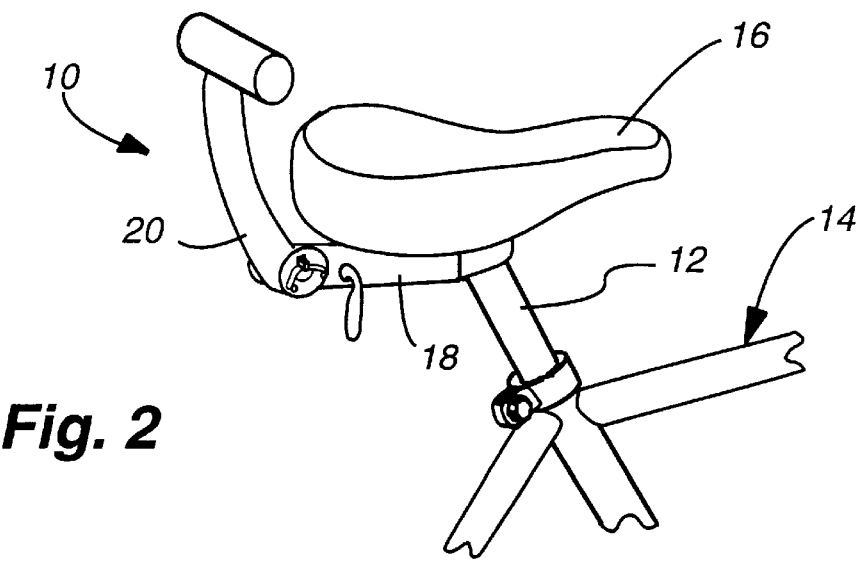
FIG. 2 is a an enlarged partial perspective view of the thrust aid device shown in FIG. 1.

Referring now to the drawing, several preferred embodiments of the invention are illustrated. Like numerals will be used for like components of the thrust aid device in the several embodiments shown in the various views of the drawing. The embodiments illustrated should be treated as representative only for descriptive purposes and not exhaustive of the many variations and alternatives that may be readily apparent to those skilled in the art.

A first embodiment of the thrust aid device 10 in accordance with the invention is shown in FIGS. 1 through 9. The thrust aid device 10 in accordance with the invention is shown fastened to a seat post 12 of a bicycle 14 beneath the bicycle seat 16. The thrust aid device 10 is generally an "L" shaped device positioned behind the bicycle seat 16. The device basically comprises an elongated mounting member 18 having one end removably fastened to the seat post 12 of the bicycle 14 and a movable thrust arm 20 connected to the other end of the mounting member 18. The thrust arm 20 is selectively movable between a first storage position with the upper end 22 of the arm 20 rotated downward, below the top of the seat 16, shown in dotted lines in FIG. 1, and a second operating position with the upper end 22 extending above the seat 16 as is shown in solid lines in FIG. 1, wherein the rider 15 can push his or her back and/or hips against the thrust arm 20 while seated on the seat 16 in order to apply increased thrust to the pedals of the bicycle 14.

The mounting member 18 preferably is a light weight hollow tube of aluminum, titanium or high strength plastic which has a generally U shaped seat post clamp 24 at one end and an open opposite end. A hinge joint socket 26 is telescopically inserted into the other end and secured in place with a quick release clamping bolt 28. The hinge joint socket 26 receives and secures the thrust arm 20 to the mounting member 18 in one of two positions and permits the thrust arm 20 to be rotated between the positions by the rider 15.

The hinge joint socket 26 has a tubular portion 30 which extends into the distal end of the mounting member 18 and a "U" shaped yoke portion 32 that has a spaced pair of parallel disk portions 34 forming the legs of the yoke portion 32. Each disk portion 34 has a central aperture 36 therethrough and a blind slot 38 radially extending from the aperture 36 in parallel relation to the slot 38 in the opposite disk portion 34. The hinge joint socket 26 may alternatively be integrally formed at the distal end of the mounting member 18.

The thrust arm 20 is preferably a curved, tubular member of aluminum, titanium, or strong plastic material and has a horizontal head piece 40 attached at the upper end 22. This head piece 40 may be simply a tubular cross bar as shown or may be another ergonomically shaped or padded support for engaging the rider's body and may be removably or permanently attached to the upper end 22. The lower end 42 of the thrust arm 20 forms the pin portion engaging the hinge joint socket 26 movably fastening the thrust arm 20 to the mounting member 18. The lower end 42 has a cross bar 44 extending therethrough at right angles to the central axis of the thrust arm 20. This cross bar 44 preferably has a rectangular cross section and engages the sides of the slot 38 in each of the disk portions of the yoke portion 32 when the thrust arm is in either the upright operating position as shown in FIG. 5 or the storage position shown in FIG. 9.

Figure 7:
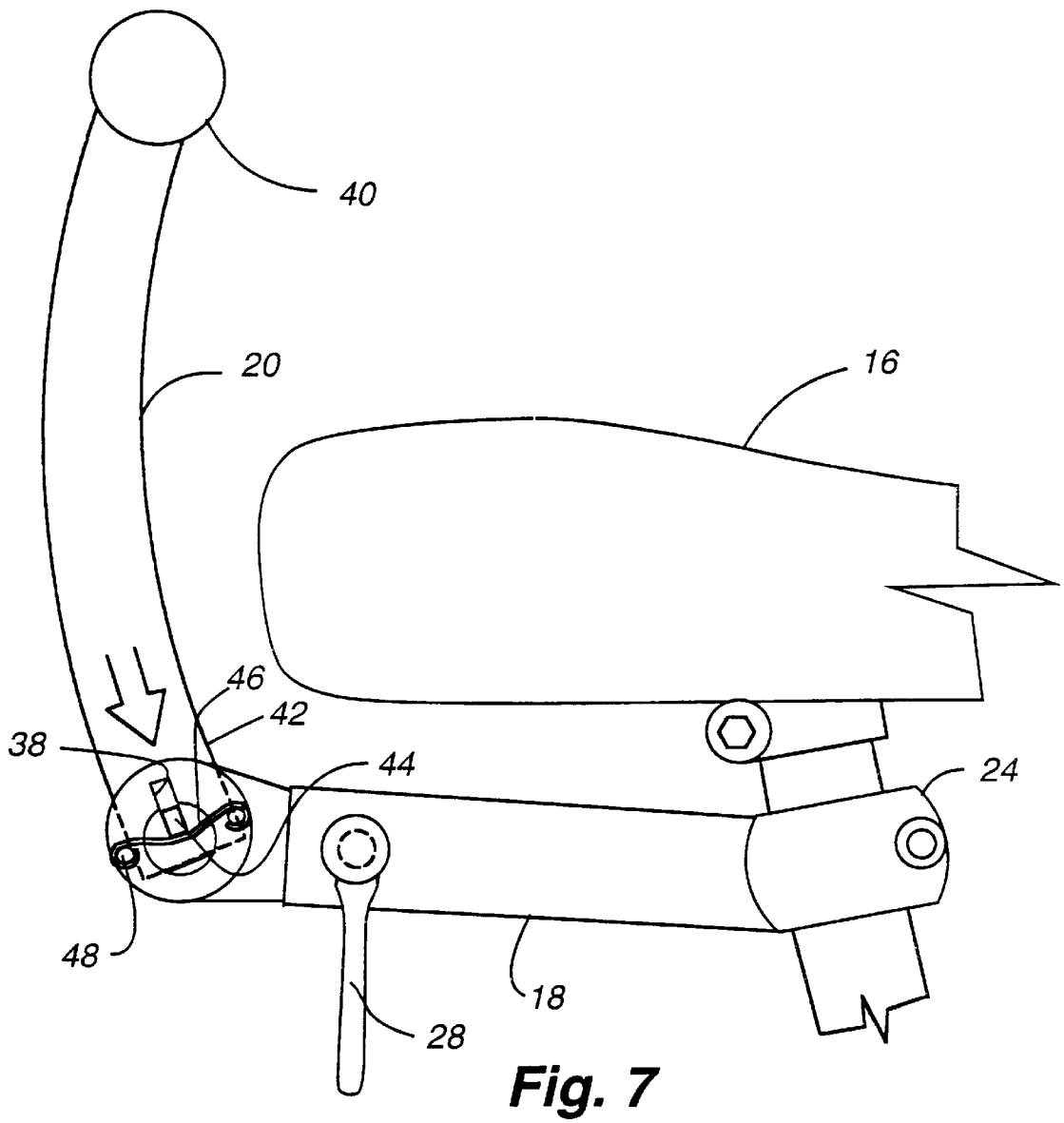
FIG. 7 is a side view of the first embodiment being pressed downward in order to rotate the thrust arm to the storage position.
Figure 8:
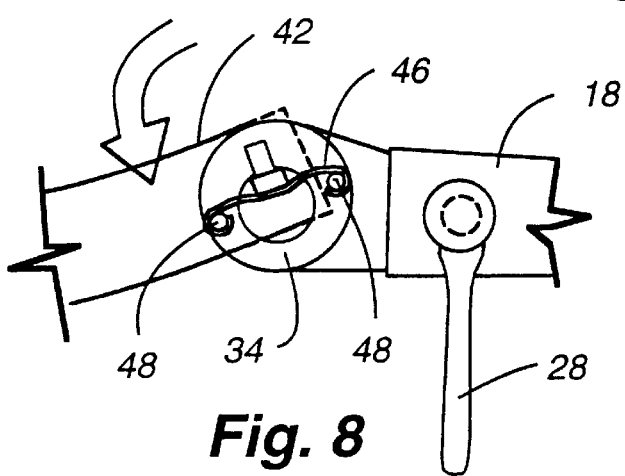
FIG. 8 is a side view of the first embodiment with the thrust arm in an intermediate position.
Figure 9:
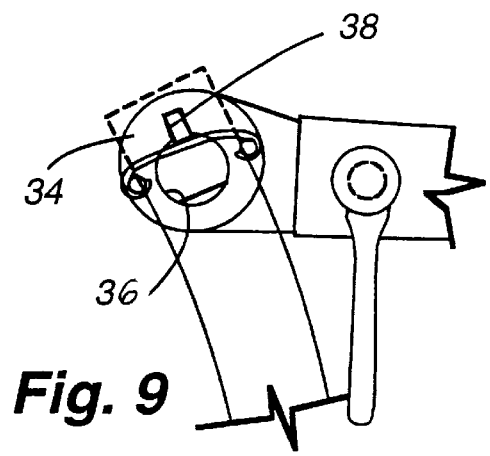
FIG. 9 is a side view of the first embodiment with the thrust arm in the second, storage position.
Figure 10:
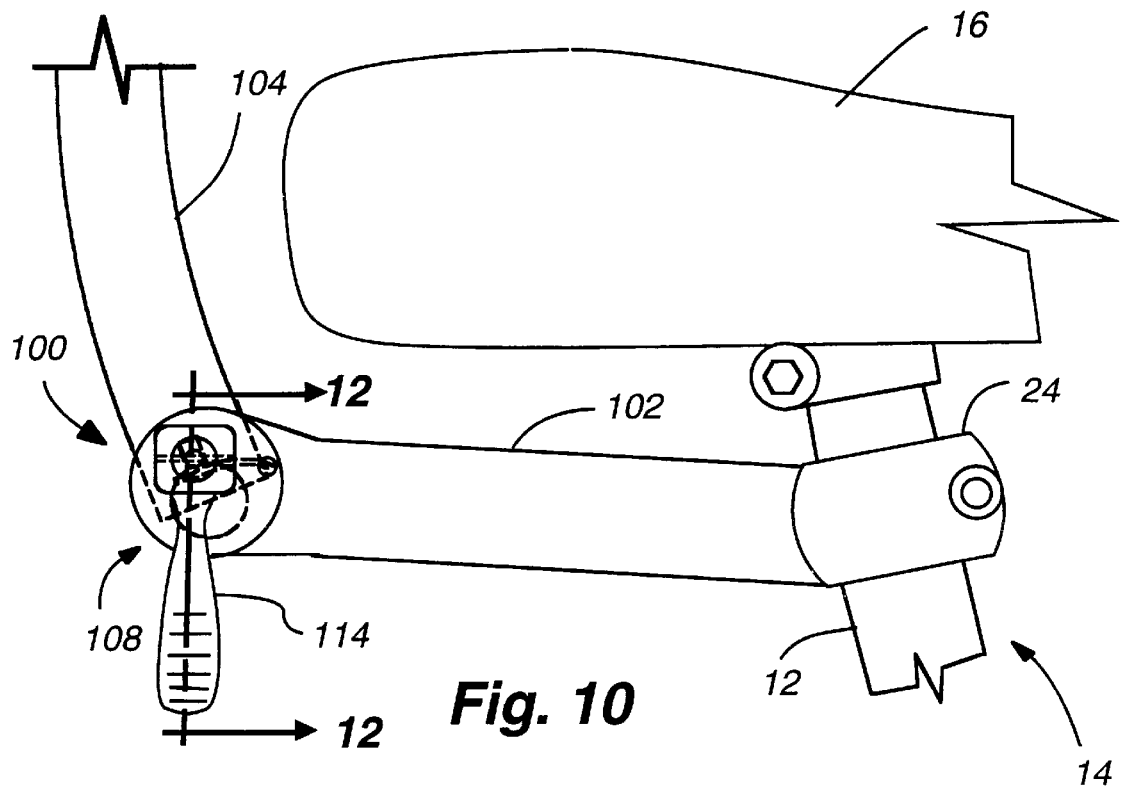
FIG. 10 is an enlarged side view of a second embodiment of the thrust aid device in accordance with the present invention.
Figure 11:
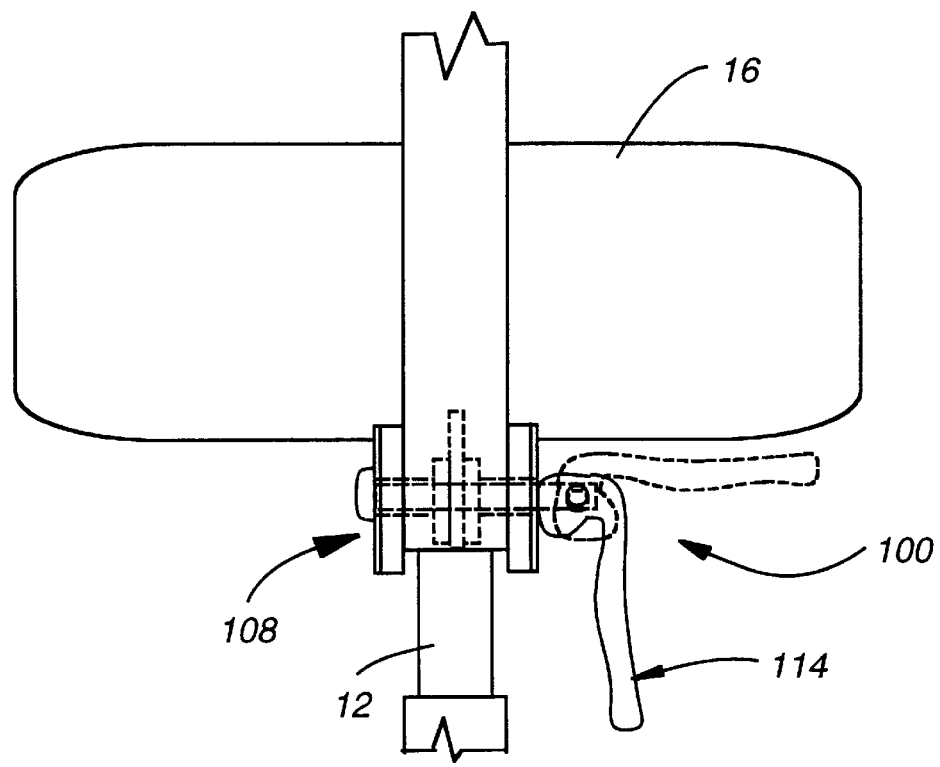
FIG. 11 is a partial rear view of the second embodiment of the thrust aid device in accordance with the present invention.

The thrust arm 20 is biased toward the slot 38 by a pair of leaf springs 46 which are secured to each disk portion 34 by two spring mounting pins 48 embedded in the outer face of the disk portion 34. The leaf springs 46 span across the aperture 36 and provide a constant upward spring force against the cross bar 44. Referring now to FIGS. 7 through 9, movement of the thrust arm between storage and operating positions is shown in detail. When the thrust arm 20 is in the operating position and the rider 15 desires to relocate the arm to the storage position, he pushes down on the arm 20 in the direction of the arrow in FIG. 7 until the cross bar 44 slips out of the slots 38. The thrust arm 34 may then be rotated as shown in FIG. 8 downward to a generally horizontal position and further to a position 180 degrees displaced from the operating position so that the cross bar 44 again can slip into the slots 38 as is shown in FIG. 9. In this storage position, the thrust arm 20 is rigidly held out of the rider's way during descents. Alternatively, if severe jarring is not expected, the thrust arm may be only partially rotated, as is shown in FIG. 8, until the thrust aid device is again needed.

A second embodiment of the thrust aid device in accordance with the present invention is shown in FIGS. 10 through 14. The thrust aid device 100 is shown fastened to a seat post 12 of a bicycle 14 beneath the bicycle seat 16. The thrust aid device 100 is again a generally an "L" shaped device positioned behind the bicycle seat 16. The device basically comprises an elongated mounting member 102 having one end removably fastened to the seat post 12 of the bicycle 14 and a movable thrust arm 104 connected to the other end of the mounting member 102. The thrust arm 104 is selectively movable between a first storage position with the upper end 106 of the arm 104 rotated downward as in the first embodiment, below the top of the seat 16, shown in dotted lines in FIG. 1, and a second operating position with the upper end 106 extending above the seat 16 as is shown in solid lines in FIG. 1 and in FIGS. 10 and 11, wherein the rider 15 can push his or her back and/or hips against the thrust arm 104 while seated on the seat 16 in order to apply increased thrust to the pedals of the bicycle 14.

The mounting member 102 preferably is a light weight hollow tube of aluminum, titanium or high strength plastic which has a seat post clamp 24 at one end and a hinge joint 108 at the other end joining the lower end 110 of the thrust arm 104. The hinge joint 108 includes a generally "U" shaped hinge joint yoke 112 integrally formed at the distal end of the mounting member 102, thus eliminating the need for the quick release clamp bolt 28 in the first embodiment. However, in this second embodiment, it is to be understood that the joint yoke 112 could be a separate component as in the first embodiment shown and described above. The yoke 112 again receives and secures the thrust arm 104 to the mounting member 102 in one of two locking positions and permits the thrust arm 104 to be rotated between the positions by the rider 15. However, in this second embodiment, the rider can select the orientation of the cross bar and therefore the upright position of the thrust arm 104 via a quick release skewer 114 shown in the locked position in solid lines in FIGS. 10 and 11 and in the unlocked position in dashed lines in FIG. 11.

Figure 14:
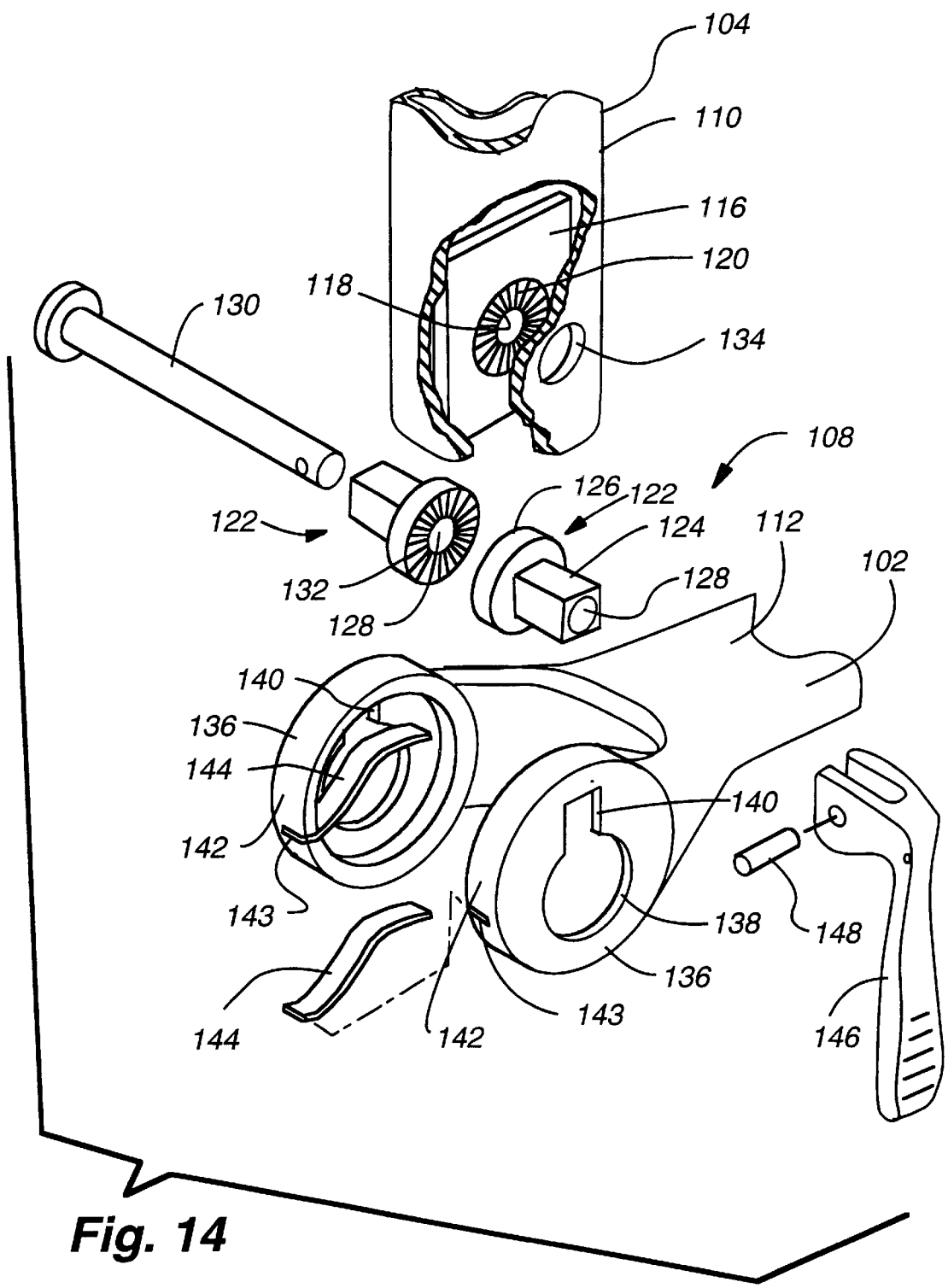
FIG. 14 is an exploded view of the locking mechanism of the thrust aid device in accordance with the second embodiment of the present invention.

Referring now to FIG. 14, the lower end 110 of the thrust arm 104 has an elongated, rectangular plate 116 disposed within the open end 110. This plate 116 may be tack welded in place or may simply be lodged in the end 110. The plate 116 has a through bore 118 surrounded on both sides of the plate 116 by radially extending sets of grooves 120. Inside the end 110 of the thrust arm 104 are located a pair of cross bar members 122. Each of the cross bar members has a flat, generally rectangular sided bar portion 124 and a coaxial larger cylindrical portion 126 with a central axial through bore 128 sized to receive a skewer pin 130 therethrough. The end faces of each of the cylindrical portions 126 has a set of radial grooves 132 therein which engage the corresponding grooves 120 on the opposite sides of the plate 116. The lower end 110 of the thrust arm 104 has a pair of transverse bores 134 therethrough which receive the bar portions 124 of each of the cross bar members 122. The bores 134 are sized to just permit free rotation of the cross bar members therein.

The "U" shaped yoke portion 112 has a spaced pair of parallel disk portions 136 forming the legs of the yoke portion 32. Each disk portion 136 has a central aperture 138 therethrough and a blind slot 140 radially extending from the aperture 36 in parallel relation to the matching slot 140 in the opposite disk portion 136. Each disk portion 136 also has a peripheral, inwardly extending tubular flange concentric about the aperture 138. This flange 142 has an axial slot 143 therein to receive one end of a leaf spring 144 which extends across the aperture 138. The leaf spring 144 engages and biases the cross bar members toward the slots 140. The leaf spring 144 may have either one or both ends embedded in the tubular flange 142. The ends of the leaf spring in the axial slots 143 is preferably press fit into each of the slots 143 to securely hold the spring 144 in place.

The thrust arm 104 is preferably a curved, tubular member of aluminum, titanium, or strong plastic material and has a horizontal head piece 40 attached at the upper end 106 as in the first embodiment. This head piece 40 may be simply a tubular cross bar or may be another ergonomically shaped or padded support for engaging the rider's body as shown in the first embodiment and may be removably or permanently attached to the upper end 106. The lower end 110 of the thrust arm 104 connects to the hinge joint 108 movably fastening the thrust arm 104 to the mounting member 102.

Figure 12:
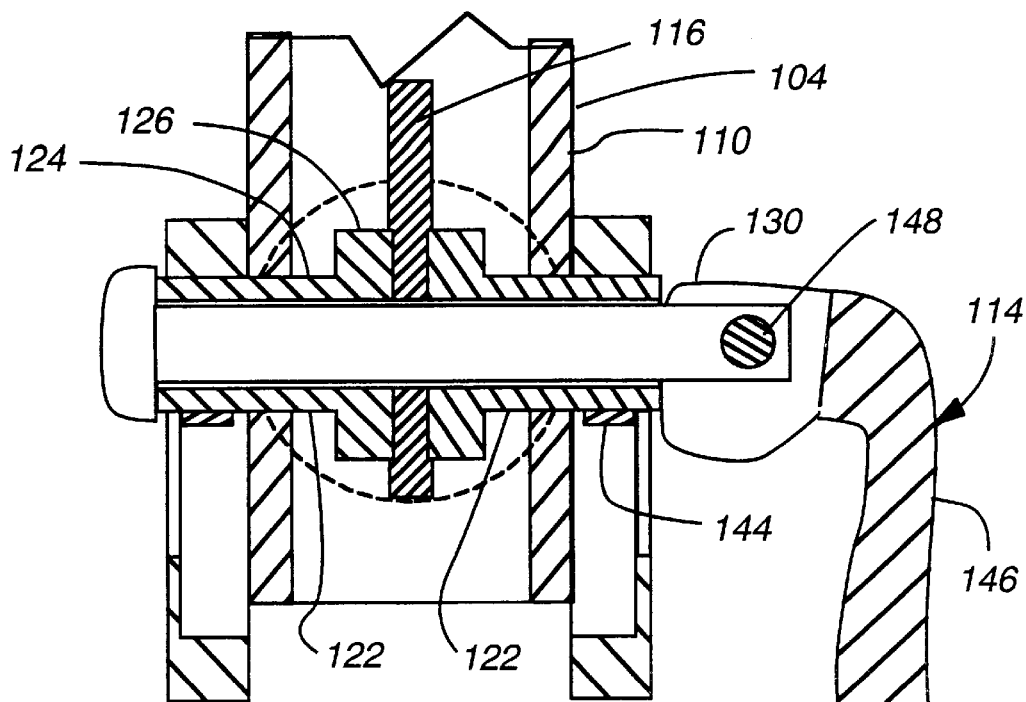
FIG. 12 is a partial sectional view of the locking mechanism in the locked position taken along the line 12—12 in FIG. 10.
Figure 13:
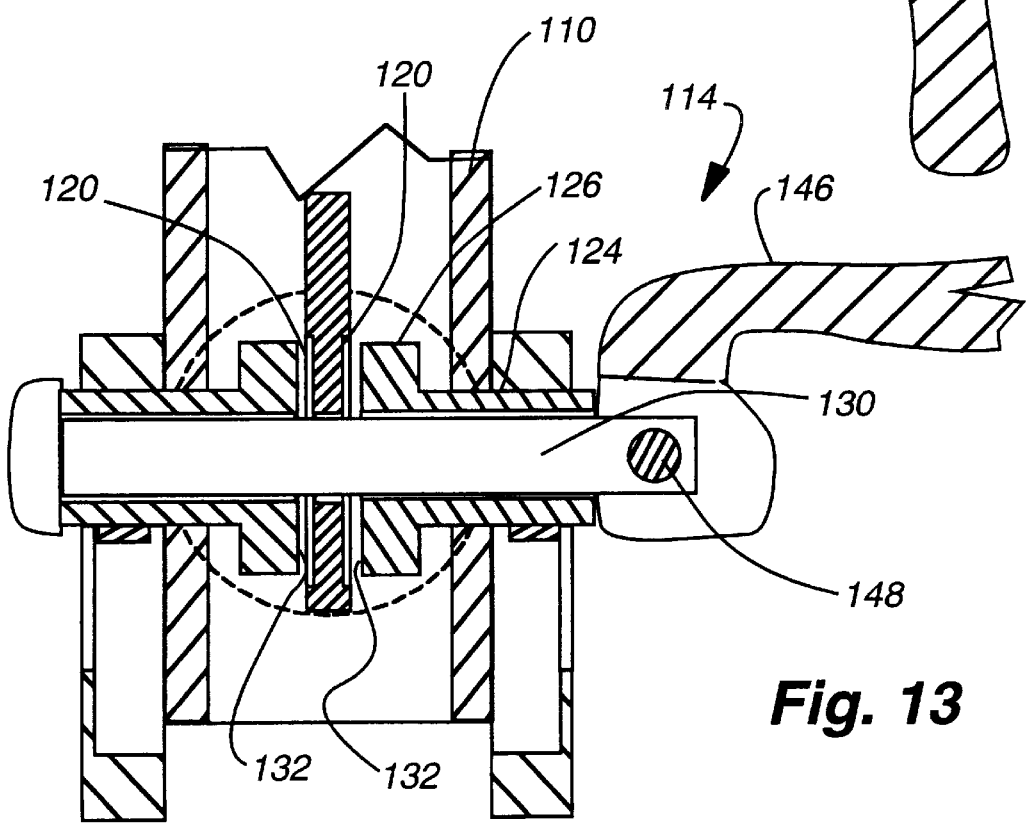
FIG. 13 is a partial sectional view of the locking mechanism in the unlocked position taken along the line 12—12 in FIG. 10.

Referring now particularly to FIGS. 12 and 13, operation of the hinge joint 108 will become apparent from the assembled cross sectional views shown. In FIG. 12, the hinge joint 108 is shown locked. In FIG. 13, the quick release lever 146, which is threaded through the cross bar members 122, the plate 116, and fastened to the skewer pin 130 via a hinge pin 148, is shown unlocked so that the grooved faces of the cross bar members 122 are disengaged from the grooves 120 on the opposite sides of the plate 116. With the skewer thus unlocked and the cross bar portions 124 engaged in the slots 140, the thrust arm 104 may be rotated without changing the position of the cross bar members 122. When the cam lever 146 is rotated downward as shown in FIG. 12, the grooves 120 and 132 interlock and the cross bars 122 are locked in position. The rider 15 then moves the thrust arm 104 between the storage position and the operating position in the same manner as in the first embodiment. Thus the rider 15 pushes down on the thrust arm to disengage the cross bar members 122 from the slots 140 and then rotates the thrust arm either up or downward to the opposite position where the cross bar members 122 again engage the slots 140 to lock the thrust arm in position.

Figure 18:
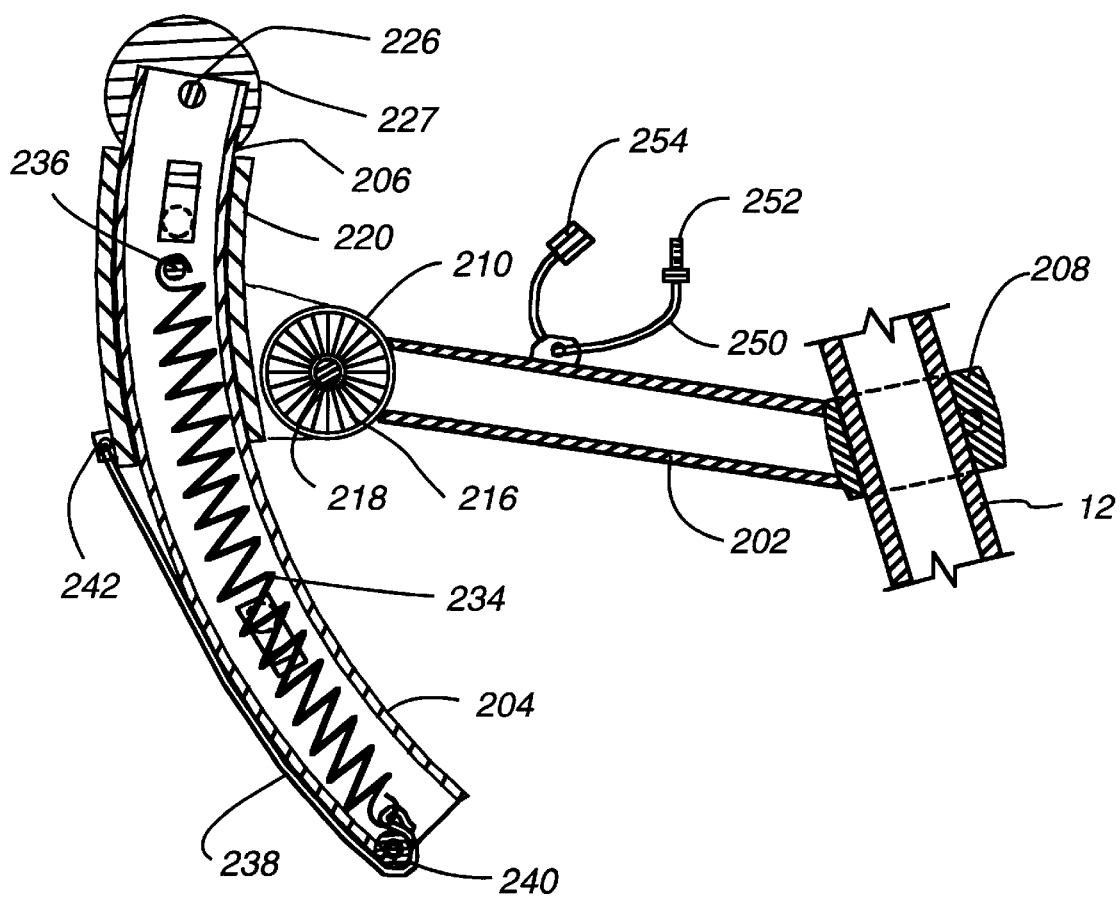
FIG. 18 is a sectional view as in FIG. 17 with the thrust arm in the storage position.
Figure 19:
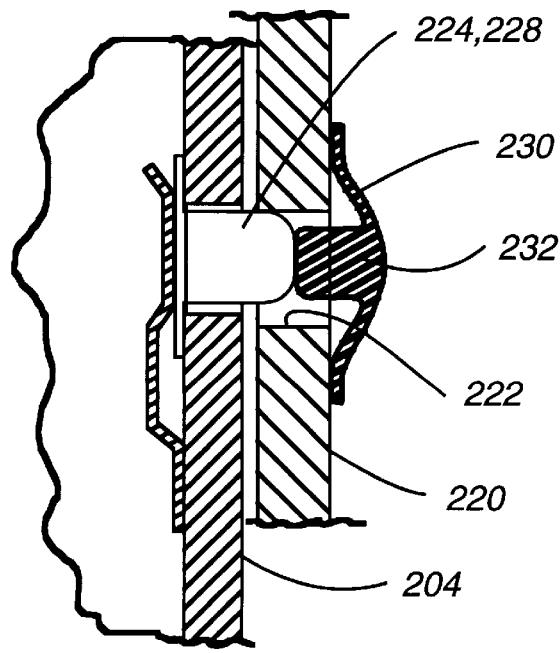
FIG. 19 is an enlarged partial sectional view of the latch pin and push button arrangement on the support sleeve.

A third preferred embodiment of the invention is shown in FIGS. 15 through 19. In FIG. 15, a thrust aid device 200 in accordance with the invention is shown fastened to a seat post 12 of a bicycle 14 beneath the bicycle seat 16. The thrust aid device 200 is generally an "L" shaped device positioned behind the bicycle seat 16. The device basically comprises an elongated mounting member 202 having one end removably fastened to the bicycle 14 and a movable thrust arm 204 connected to the other end of the mounting member 202. The thrust arm 204 is selectively movable between a first storage position as shown in FIG. 18 with the upper end 206 of the arm 204 retracted downward below the top of the seat 16 and a second operating position with the upper end 206 extending up above the seat 16 as is shown in FIGS. 15–17, wherein the rider can push his or her back and/or hips against the thrust arm 204 while seated on the seat 16 in order to apply increased thrust to the pedals of the bicycle 14.

The mounting member 202 preferably is a light weight hollow tube of aluminum, titanium or high strength plastic which has a generally U shaped seat post clamp 208 at one end and a lockable hinge joint 210 at the other end. The hinge joint 210 secures a thrust arm support sleeve 212 to the mounting member 202. The hinge joint 210 preferably comprises a pair of matched, generally circular joint wafers or disks 214 and 216 which each have a radially grooved surface mating with the other. The hinge joint 210 further includes a through bolt 218 which passes through the mated disks 214 and 216 and fastens the two disks together. This through bolt 218 clamps the disks 214 and 216 together via a nut on the bolt 218 or the bolt could include a quick release locking cam lever arrangement in place of the nut and bolt as in the first two embodiments described above.

One of the joint disks 214 is preferably integrally formed in the distal end of the mounting member 202. The other joint disk 216 is preferably integrally formed of a disk portion of the thrust arm support sleeve 212. The radial serrations or grooves in the disk faces of disks 214 and 216 permit the bicycle rider to adjust the angle between the thrust arm support sleeve 212 and the mounting member 202.

The thrust arm support sleeve 212 has a tubular portion 220 slidably receiving the lower end of the thrust arm 204 therein. This support sleeve also has an aperture 222 through the sleeve side wall which receives a spring loaded latch pin 224 protruding from the side of the thrust arm 204.

The thrust arm 204 is a generally hollow tubular member made of aluminum, titanium or high strength plastic material. The thrust arm 204 has a transverse cushioned cross bar or head piece 226 fastened to the upper, distal end of the arm 204. This head piece 226 is shown in FIGS. 15 to 18 as a bar mounted at right angles to the thrust arm 204 and covered by a foam rubber cushion 227. Other shapes may alternatively be used. For example, a small, curved plate may be swivel mounted to the upper end 206 of the thrust arm 204 to facilitate rider comfort and limited movement while in use. Alternatively, the head piece may be detachable and several different interchangeable head p T shapes made available for the rider to use.

The thrust arm 204 has a spring loaded first latch pin 224 projecting outward from the side of the arm 204 and located adjacent the distal upper end 206 of the arm 204. A second spring loaded latch pin 228 projects outward from the side of the arm 204 and is located near the lower end of the thrust arm 204. This latch pin 228 engages the aperture 222 in the thrust support sleeve when the thrust arm 204 is raised to the operating or second position as is shown in FIG. 17. The aperture 222 preferably has a rubber cover 230 to form a covered push button 232 that the rider presses to disengage the latch pin and move the thrust arm 204 between first and second positions.

This embodiment of the thrust aid device 200 preferably includes an internal spring arrangement 234 in order to bias the thrust arm 204 in the second, or operating position so that the rider merely has to depress the push button 230 to disengage the latch pin 228 and press the thrust arm 204 down against spring tension until the latch pin 224 engages the aperture 222 and the thrust arm is thus secured in the first, or storage position. When the latch pin 224 is disengaged from the aperture 222, the thrust arm 204 then pops back up to the operating or second position where the latch pin 228 again engages the aperture 222.

The biasing spring 234 is a conventional coil spring having one end hooked onto a cross bar 236 inside the thrust arm 204 and the other end hooked onto one end of a cable 238. The other end of the cable 238 passes through the thrust arm 204 and the tubular portion 220 of the sleeve 212, over a roller 240 and is fastened to the sleeve 212 via a screw 242.

An alternative third embodiment of the above described thrust aid device 200 has a sleeve portion 220 of the support sleeve 212 which extends fully along the length of the retracted thrust arm 204 in the storage position and acts as a scabbard for the thrust arm 204. In this alternative, the bias spring 234 then would extend from the closed bottom of the support sleeve 212 through the interior of the thrust arm 204 to the bar 236 or headpiece 226. In the first or storage position, the thrust arm would fully extend down into the thrust sleeve, compressing the spring 234. When the release button 232 is depressed, the thrust arm 204 would extend upward from the sleeve 212 via spring pressure to the operating or second position above the seat 16 as shown in FIG. 15.

As shown in FIGS. 17 and 18, the third preferred embodiment includes a reinforcing cable or strap 250 fastened to the middle of the mounting member 202. This reinforcing strap 250 is designed to be optionally threaded over the seat rails of the seat 16 and then the threaded portion 252 is fastened to the nut 254 on the other end of the reinforcing strap or cable 250. This arrangement reduces the moment arm on the clamp 208 of the mounting member 202 on the seat post 12 and thus reinforces the mounting arm during heavy thrust loading in operation. Another means of reinforcing the clamp 208 to reduce the concentration of forces during use of the thrust aid device 200 is to widen the clamp 208 surface area in contact with the seat post 12 or provide a downwardly extending rib below the mounting member in contact with the seat post 12.

Another alternative to the third embodiment above described would be to have the biasing spring mounted externally to the thrust arm 204. In this alternative embodiment, not shown, the coils of the spring would wrap around the thrust arm 204 and the spring would be compressed between the head piece 226 and a flange (not shown) on the tubular portion 220 of the support sleeve 212 as the thrust arm 204 is moved from the operating second position to the storage or first position.

The locking hinge 210 may also be other than as shown in FIGS. 15 through 18. For example, the facing surfaces of wafers 214 and 216 may include complementary key and slot combinations or mating male and female posts and holes rather than wedge shaped radial grooves as shown. The facing surfaces may alternatively be generally flat and have rough frictional surfaces to permit an infinite number of angles between the thrust arm 204 and the mounting member 202.

The thrust arm 204 is shown as being a round, curved in FIGS. 15 through 18. The thrust arm 204 may alternatively be straight and/or may have a box or shaped cross section. In the alternative which has an external spring, the thrust arm may have a solid or "T" cross section rather than being a hollow tube.

While the invention has been described with reference to particular embodiments thereof, it is to be understood that many alternatives variations, and modifications may be made and will become obvious to those skilled in the art upon reading this specification in conjunction with the accompanying drawing figures. The embodiments of the invention have been described by way of examples only and not by way of limitation. It is not intended to be exhaustive or to limit the invention to the precise form disclosed. Accordingly, all such equivalents, modifications, alternatives and variations are intended to be included within the scope of the invention as defined by the appended claims.

What is claimed is:

1. A thrust aid device for use on a bicycle comprising:
   an elongated mounting member having one end adapted to be fastened to a seat post supporting a seat on said bicycle;
   an open ended tubular thrust arm support sleeve adjustably fastened to an opposite end of said mounting member;
   a retractable thrust arm having a tubular body slidably disposed in and extending through said thrust arm support sleeve, said arm being selectively positionable between a first retracted position in said support sleeve and a second extended position;
   a biasing means inside said thrust arm connected between said thrust arm support sleeve and said thrust arm for urging said thrust arm between said first position and said second position, said biasing means having a portion extending out of a bottom end of said thrust arm and attaching to said support sleeve; and a latch means on said thrust arm for securing said thrust arm in said support sleeve in each of said first and said second positions whereby an upper portion of said arm is adapted to be retained below said seat in said first position when said mounting member is fastened to a seat post on a bicycle and in said second extended position said upper portion of said arm is adapted to extend above said seat whereby a rider sitting on said bicycle seat can push back against said support arm in said first position while pedaling said bicycle and can move forward and back over said seat when said arm is in said second, retracted position.

2. The thrust aid device according to claim 1 wherein said thrust arm is spring biased toward said second position.

3. The thrust aid device according to claim 2 wherein said thrust arm is retained in said first position by a movable push button latch coupled between said thrust arm and said support sleeve.

4. The thrust aid device according to claim 3 wherein said support sleeve has an internal coil spring extending through said sleeve and through a lower portion of said thrust arm.

5. The thrust aid device according to claim 4 wherein said thrust arm has a bar member fastened to an upper end thereof.

6. The thrust aid device according to claim 1 wherein said thrust arm support sleeve is fastened to said mounting member by a vertically rotatable joint having a clamp for locking said support sleeve in a desired position with respect to said mounting member.

7. The thrust aid device according to claim 6 wherein said clamp includes a cam operated skewer through said joint to adjustably lock said support sleeve in position.

8. The thrust aid device according to claim 1 wherein said mounting member is adapted to be fastened to said seat post by a quick release clamp.

\* \* \* \* \*